United States Patent
Vogl et al.

(10) Patent No.: US 12,476,012 B2
(45) Date of Patent: Nov. 18, 2025

(54) COMPUTER-IMPLEMENTED METHOD AND DEVICE FOR AUTOMATIC PREDICTION OF GEOGRAPHIC ATROPHY

(71) Applicant: RetInSight GmbH, Vienna (AT)

(72) Inventors: Wolf-Dieter Vogl, Vienna (AT); Ursula Schmidt-Erfurth, Vienna (AT)

(73) Assignee: RetInSight GmbH, Vienna (AT)

( * ) Notice: Subject to any disclaimer, the term of this patent is extended or adjusted under 35 U.S.C. 154(b) by 312 days.

(21) Appl. No.: 18/365,197

(22) Filed: Aug. 3, 2023

(65) Prior Publication Data
US 2025/0046470 A1 Feb. 6, 2025

(51) Int. Cl.
G06K 9/00 (2022.01)
A61K 35/12 (2015.01)
G06T 7/00 (2017.01)
G06T 7/12 (2017.01)
G06V 10/74 (2022.01)
G16H 50/50 (2018.01)

(52) U.S. Cl.
CPC .......... *G16H 50/50* (2018.01); *G06T 7/0012* (2013.01); *G06T 7/12* (2017.01); *G06V 10/761* (2022.01); *G06T 2207/10101* (2013.01); *G06V 2201/03* (2022.01); *G06V 2201/12* (2022.01)

(58) Field of Classification Search
CPC ........... G16H 50/50; G06K 9/00; A61K 35/12
USPC ....... 382/100, 103, 106, 128–133, 151, 168, 382/173, 181, 199, 224, 254, 286–291, 382/305; 702/2; 378/4, 21
See application file for complete search history.

(56) References Cited

U.S. PATENT DOCUMENTS

| | | | |
|---|---|---|---|
| 10,117,568 B2* | 11/2018 | Reisman | A61B 3/102 |
| 12,165,434 B2* | 12/2024 | Manivannan | G06V 40/197 |
| 2023/0157533 A1* | 5/2023 | Chang | G16H 50/30 |
| | | | 705/2 |

(Continued)

OTHER PUBLICATIONS

Vogl, Wolf-Dieter et al., "Predicting topographic disease progression and treatment response of pegcetacoplan in geographic natrophy quantified by deep learning," American Academy of Ophthalmology, vol. 7, Issue 1, Jan. 2023, pp. 4-13, 10 pages.

(Continued)

*Primary Examiner* — Seyed H Azarian
(74) *Attorney, Agent, or Firm* — Alleman Hall & Tuttle LLP

(57) ABSTRACT

A method for automatic prediction of a geographic atrophy (GA) from optical coherence tomography (OCT) data of a retina of a patient includes segmenting the OCT data using a first segmentation algorithm for providing a GA segmentation of the geographic atrophy in the retina, and segmenting the OCT data for providing structure-specific segmentations of certain structures in the retina. The method further includes determining a GA contour in the retina using the GA segmentation, and for each margin point of the GA contour, providing a number of quantifiable features using the GA contour and structure-specific segmentations such that a feature vector including the quantifiable features is provided for each margin point. The method further includes providing a respective local progression rate for each of the margin points by applying a spatial regression model having as inputs the GA contour and the feature vectors for the margin points.

14 Claims, 6 Drawing Sheets

(56) References Cited

U.S. PATENT DOCUMENTS

| | | | |
|---|---|---|---|
| 2023/0326024 A1* | 10/2023 | Yang | G06T 7/0012 |
| | | | 382/131 |
| 2024/0203101 A1* | 6/2024 | Zhang | G06V 20/70 |
| 2024/0206727 A1* | 6/2024 | Wang | G16H 30/40 |

OTHER PUBLICATIONS

Moult, Eric M. et al., "Analysis of Correlations between Local Geographic Atrophy Growth Rates and Local OCT Angiography-Measured Choriocapillaris Flow Deficits," Biomedical Optics Express, vol. 12, No. 7, Jul. 1, 2021, 23 pages.

Lachinov, Dmitrii et al., "Projective skip-connections for segmentation along a subset of dimensions in retinal OCT," Medical Image Computing and Computer Assisted Intervention—MICCAI 2021, Aug. 2, 2021, 13 pages.

Schlegl, Thomas et al., "Fully automated segmentation of hyper-reflective foci in optical coherence tomography images," arXiv link: arXiv: 1805.03278, May 8, 2018, 12 pages.

Orlando, José Ignacio et al., "Automated quantification of photoreceptor alteration in macular disease using optical coherence tomography and deep learning," Scientific Reports, vol. 10, Mar. 27, 2020, 12 pages.

* cited by examiner

COMPUTER-IMPLEMENTED METHOD AND DEVICE FOR AUTOMATIC PREDICTION OF GEOGRAPHIC ATROPHY

FIELD

The present invention relates to a computer-implemented method and to a computer-implemented device for an automatic prediction of geographic atrophy (GA) from optical coherence tomography data of a retina of a patient. The technical field of the present invention is the automatic prediction of geographic atrophy from OCT data.

BACKGROUND

Geographic Atrophy secondary to non-neovascular age-related macular degeneration (AMD) is a chronic progressive degeneration of the neurosensory macula, threatening vision and leading ultimately to irreversible blindness. GA progresses slowly and progression speed is highly variable between individual patients and show even a heterogeneous speed at the level of an individual GA lesion.

Thus, predicting the onset speed of GA is very challenging. Although, estimating disease progression may be a relevant factor for patient management in order to identify fast progressors that will need the treatment the most. Conventional methods for processing optical coherence tomography data are described in Moult et al. (Moult E M, Moult E M, Shi Y, Zhang Q, Wang L, Mazumder R, et al. Analysis of Correlations between Local Geographic Atrophy Growth Rates and Local OCT Angiography Measured Choriocapillaris Flow Deficits. Biomed. Opt. Express, BOE. 2021; 12(7):4573-4595) and Lachinov et al. (D. Lachinov, P. Seeböck, J. Mai, F. Goldbach, U. Schmidt-Erfurth, and H. Bogunovic, "Projective skip-connections for segmentation along a subset of dimensions in retinal oct," in MICCAI 2021. Springer International Publishing, 2021, pp. 431-441). Accordingly, it is an aspect of the present disclosure to improve the automatic prediction of geographic atrophy from optical coherence tomography data of a retina.

SUMMARY

According to a first aspect, a computer-implemented method for automatic prediction of geographic atrophy (GA) from optical coherence tomography (OCT) data of a retina of a patient is proposed. The computer-implemented method includes the following steps:
a) receiving OCT data of the retina of the patient,
b) segmenting the received OCT data using a first segmentation algorithm for providing a GA segmentation of the geographic atrophy in the retina,
c) segmenting the received OCT data using a number N1, with N1≥1, of second segmentation algorithms for providing a number N1 of structure-specific segmentations of certain structures in the retina,
d) determining a GA contour of the geographic atrophy in the retina using the provided GA segmentation,
e) for each margin point of N2 margin points of the GA contour, providing a number N3 of quantifiable features using the provided GA contour and using the provided N1 structure-specific segmentations such that a feature vector including the N3 quantifiable features is provided for each margin point of the GA contour, and
f) providing a respective local progression rate for each of the N2 margin points by applying a spatial regression model having as inputs the GA contour and the N2 feature vectors for the N2 margin points of the GA contour.

By using the local progression rates of the margin points of the GA contour, an onset of atrophy may be predicted. Moreover, using the provided local progression rates of the N2 margin points, a growth rate, in particular in mm/yr, of the atrophy may be predicted. For example, the certain structures in the retina include hyperreflective foci in the retina and photoreceptors in the retina. Therefore, the structure-specific segmentations may include a hyperreflective foci (HRF) segmentation of hyperreflective foci in the retina and a photoreceptor (PR) segmentation of photoreceptors in the retina.

In particular, the step c) may be referenced as a segmentation step, and the step e) may be referenced as a quantifying step. The quantifying step may output a feature vector including the Euclidian distance, the HRF concentration, and the PR thickness for each margin point of the N2 margin points.

The present method may be referenced as disease progression method (DPM). The present method is capable of predicting the onset of the atrophy on a local level. That means, the present method does not predict a global measure such as a total GA area (e.g. in mm$^2$). Instead, the present method is capable of predicting the growth rate on a local level. Advantageously, the prediction on a finer level allows to predict GA growth more precisely as it is heterogeneous and affected by many factors, e.g. including photoreceptor thickness, distance to fovea, and the like. Moreover, topographical resolved prediction is also clinically relevant. For instance, GA progression towards the fovea center has a bigger impact on vision than progression towards periphery.

In particular, the presently used spatial regression model may predict the local progression rate (LPR) in μm/year for each margin point of the GA contour. This prediction is based on features, e.g. including HRF, PR and retina layers (RL), that are automatically segmented, quantified and extracted from the OCT data, for example spectral domain (SD)-OCT images. For example, the features are automatically extracted for each GA margin point and include the progression direction, eccentricity (i.e. the distance of the margin point to the fovea center), the thickness of photoreceptors, and the concentration of the HRF in the conjunction to the margin point.

To learn the model parameters, the LPR has been estimated from baseline and one year segmentation of GA using a biophysical growth model framework as described in Moult et al. Briefly, the GA margin evolution from baseline to one year follow-up is modeled as a partial differential equation (PDE) using a level-set framework with two terms, a constant expansion perpendicular to the GA margin, and a curvature term enforcing a faster progression for concave margin parts. The distribution of LPR is heavily right-skewed and has an excessive proportion of zero values due to SD-OCT sensor limits, where a growth below approximately 12 and 120 μm across A-scans and B-scans, respectively, cannot be observed. The spatial regression model may include a compound Poisson-gamma distribution (a subtype of a Tweedie distribution) that has a positive mass at zero. Furthermore, there is a strong autocorrelation between GA margin points which are points which are close in space, as they have similar LPRs. The spatial regression model accounts for spatial correlation by incorporating a spatial autocorrelation structure with exponential decay.

To predict the LPR for a new subject, the GA lesion, and the predictive imaging biomarkers (photoreceptors, HRF)

may be segmented in the OCT, and quantified in the junction for each GA margin point. These features may be fed into the DPM providing and estimating of LPR in μm/year.

In the present DPM, LPR is used as a measure for predicting local growth of GA. For training, LPR is estimated by a partial differential equation (PDE). Presently, a combination of topographic and OCT imaging biomarkers may be used to predict the LPR.

In embodiments, the DPM is a continuous spatio-temporal DPM. The DPM may incorporate domain knowledge in terms of constraints of the embedding or logit space to ensure a non-negative growth. The present DPM introduces a metric denoted as soft temporal dice loss to measure the overlap of annotated and predicted segmentations over an entire stack of visits for the training of the SRM.

The patient may be a human or a non-human animal. In particular, the OCT data are provided by an OCT scanner which is capable of scanning the retina of a human being or a non-human animal.

In embodiments, the OCT data includes a three-dimensional retinal OCT image.

In a further embodiment, the spatial regression model is a non-linear spatial regression model. In particular, the spatial regression model is a generative additive mixed effects model (GAMM). In particular, image features are automatically segmented and quantified in an OCT image and a spatial GAMM is used to predict the GA progression speed locally for the GA margin, and thus capturing the heterogeneous progression speed of the lesion. For the present DPM, GAMM with a compound Poisson-gamma distribution and spatial autocorrelation structure is preferably selected to model LPR locally and non-linearly.

In a further embodiment, the step c), i.e. the segmentation step, includes:
c1) segmenting the received OCT data using a hyperreflective foci segmentation algorithm for providing a HRF segmentation of the hyperreflective foci in the retina,
c2) segmenting the received OCT data using a photoreceptor segmentation algorithm for providing a PR segmentation of the photoreceptors in the retina, and/or
c3) segmenting the received OCT data using a retina layer segmentation algorithm for providing a retina layer segmentation of the retina layers of the retina.

In the present embodiment, the segmentation step has as outputs: the GA segmentation of the GA in the retina, the HRF segmentation of the hyperreflective foci in the retina, the PR segmentation of the photoreceptors in the retina, and the retina layer segmentation of the retina layers of the retina.

For example, a HRF segmentation algorithm is described in Schlegl et al. (Schlegl, T., Bogunovic, H., Klimscha, S., Seebock, P., Sadeghipour, A., Gerendas, B., . . . & Schmidt-Erfurth, U. (2018). Fully automated segmentation of hyperreflective foci in optical coherence tomography images. arXiv preprint arXiv: 1805.03278). Further, an example for a PR segmentation algorithm is described in Orlando et al. (Orlando, J. I., Gerendas, B. S., Riedl, S., Grechenig, C., Breger, A., Ehler, M., . . . & Schmidt-Erfurth, U. (2020). Automated quantification of photoreceptor alteration in macular disease using optical coherence tomography and deep learning. Scientific reports, 10(1), 5619).

In a further embodiment, the step e) includes, for providing the respective feature vector for the respective margin point of the N2 margin points of the GA contour:
e1) determining a Euclidian distance of the margin point to the fovea,
e2) providing a HRF concentration using the provided GA contour and the provided HRF segmentation,
e3) providing a PR thickness using the provided GA contour and the provided PR segmentation,
e4) providing the retina layers using the provided GA contour and the provided retina layer segmentation, and/or
e5) determining a progression direction of the geographic atrophy in the retina.

In the present embodiment, the respective feature vector includes the Euclidian distance, the HRF concentration, the PR thickness, the retina layers and the progression direction of the geographic atrophy in the retina.

In a further embodiment, the step e2) is embodied by: determining a mean HRF concentration for the feature vector of the respective margin point by adding the volumes of the HRF in a certain junctional zone around the respective margin point and dividing the added volumes by the area of the junctional zone.

In a further embodiment, the step e3) is embodied by: determining a mean PR thickness for the feature vector of the respective margin point by adding the values of the PR thicknesses in a certain junctional zone around the respective margin point and dividing the added values by the area of the junctional zone.

In a further embodiment, the method further includes step g):
predicting an onset of atrophy using the provided local progression rates of the N2 margin points.

In a further embodiment, the method further includes step h):
predicting a growth rate of the atrophy using the provided local progression rates of the N2 margin points.

In a further embodiment, the OCT data is embodied as one single OCT image of the retina of the patient, and steps a)-f) are executed based on said single OCT image.

Any embodiment of the first aspect may be combined with any embodiment of the first aspect to obtain another embodiment of the first aspect.

According to a second aspect, a computer-implemented device for an automatic prediction of a geographic atrophy (GA) from optical coherence tomography (OCT) data of a retina of a patient is proposed. The computer-implemented device includes:
one or more processors,
a receiving unit which is configured to receive the OCT data captured by a medical imaging unit, and
a memory coupled to the one or more processors, the memory comprising a module configured to perform the method steps of the first aspect or of any embodiment of the first aspect using a trained machine learning network.

In embodiments, the receiving device is embodied as an OCT device or as an intermediate imaging computer platform, for example as a picture archiving and communication system.

In embodiments, the one or more processors are included in a cloud server, particularly including a cloud-based artificial intelligence platform and a web-based user interface.

As the one or more processors and the memory are preferably part of a cloud-based system, a framework is provided that allows of applying complex and computation intensive models on an OCT scan without the need of additional expensive hardware on the operator's side, as the computation may be performed on a server instance in the cloud. On a cloud server, the present algorithms for segmentation, modelling and prediction may be applied. After processing, the ophthalmologist may access a report containing the analyzed OCT and predicted outcomes also within a user interface of the computer-implemented device.

The present approach has several advantages to an approach where processing is done locally:

Scalability: Due to the structure of the architecture, the computer-implemented device is easily scalable, allowing it to handle large volumes of data and user requests. This is especially important for healthcare applications, where the number of patients and medical records can be substantial.

Resilience: The microservices architecture of the computer-implemented device improves the resilience of the tool, by allowing services to be distributed across multiple servers or data centers. This can help to reduce the risk of downtime or service disruptions, which can have serious consequences in a healthcare setting.

Security: The cloud-based microservices provide enhanced security features such as encryption, access control, and monitoring, to protect sensitive patient data from unauthorized access or breaches.

The computer-implemented device may be a computer or an embedded system, for example. The processor may be embodied as a hardware device, e.g. as a part of a computer or system.

According to a third aspect, a system for an automatic prediction of a geographic atrophy from optical coherence tomography data of a retina of a patient is proposed. The system includes one or more servers, a medical imaging unit coupled to the one or more servers, the one or more servers comprising instructions, which when executed causes the one or more servers to perform the method steps of the first aspect or of any embodiment of the first aspect using a trained machine learning network.

According to a fourth aspect, a computer program product comprising machine readable instructions, that when executed by one or more processors, cause the one or more processors to perform the method steps of the first aspect or of any embodiment of the first aspect.

According to a fifth aspect, a non-transitory computer readable medium is proposed on which program code sections of a computer program are saved. The program code sections are loadable into and/or executable in a system to make the system execute the method steps of the first aspect or of any embodiment of the first aspect when the program code sections are executed in the system.

In the following, exemplary embodiments of the present invention are described with reference to the enclosed figures.

BRIEF DESCRIPTION OF THE DRAWINGS

Similar or functionally similar elements in the figures have been allocated the same reference characters if not otherwise indicated.

DETAILED DESCRIPTION OF THE EMBODIMENTS

Figure 1:
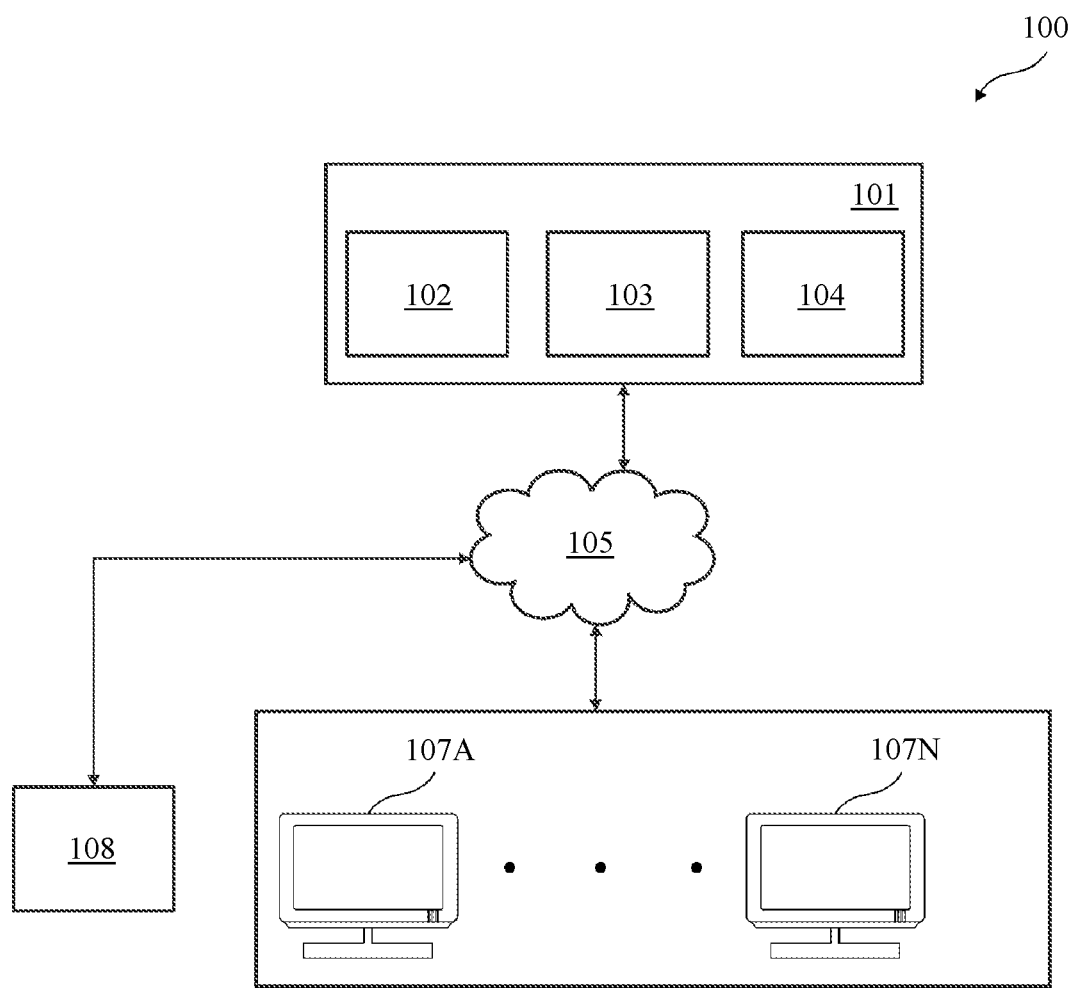
FIG. 1 illustrates a block diagram of a client-server architecture embodying a system for automatic prediction of a geographic atrophy (GA) from optical coherence tomography data of a retina of a patient according to an embodiment of the present invention.

Hereinafter, embodiments for carrying out the present invention are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

FIG. 1 provides an illustration of a block diagram of a client-server architecture embodying a system for automated processing of medical images to output alerts for detected dissimilarities in the medical images. The client-server architecture 100 comprises a server 101 and a plurality of client devices 107A-N. Each of the client devices 107A-N is connected to the server 101 via a network 105, for example, local area network (LAN), wide area network (WAN), wireless network, etc. In one embodiment, the server 101 is deployed in a cloud computing environment. As used herein, "cloud computing environment" refers to a processing environment comprising configurable computing physical and logical resources, for example, networks, servers, storage, applications, services, etc., and data distributed over the network 105, for example, the internet. The cloud computing environment provides on-demand network access to a shared pool of the configurable computing physical and logical resources. The server 101 may include a medical database 102 that comprises medical images and associated medical data related to a plurality of patients that is maintained by a healthcare service provider. In an embodiment, the medical database 102 comprises images captured by a MR scanner and/or by a CT scanner. The server 101 may include a module 103 that is configured to perform automated processing of medical images to output alerts A (see FIG. 6 and FIG. 7) for detected dissimilarities in medical images. Additionally, the server 101 may include a network interface 104 for communicating with the client device 107A-N via the network 105.

The client devices 107A-N are user devices, used by users, for example, medical personnel such as a radiologist, pathologist, physician, etc. In an embodiment, the user device 107A-N may be used by the user to receive medical images associated with the patient. The data can be accessed by the user via a graphical user interface of an end user web application on the user device 107A-N. In another embodiment, a request may be sent to the server 101 to access the medical images associated with the patient via the network 105. An imaging unit 108 may be connected to the server 101 through the network 105. The unit 108 may be a medical imaging unit 108 capable of acquiring a plurality of medical images. The medical imaging unit 108 may be, for example, a scanner unit such as a magnetic resonance imaging unit, computed tomography imaging unit, an X-ray fluoroscopy imaging unit, an ultrasound imaging unit, etc.

Figure 2:
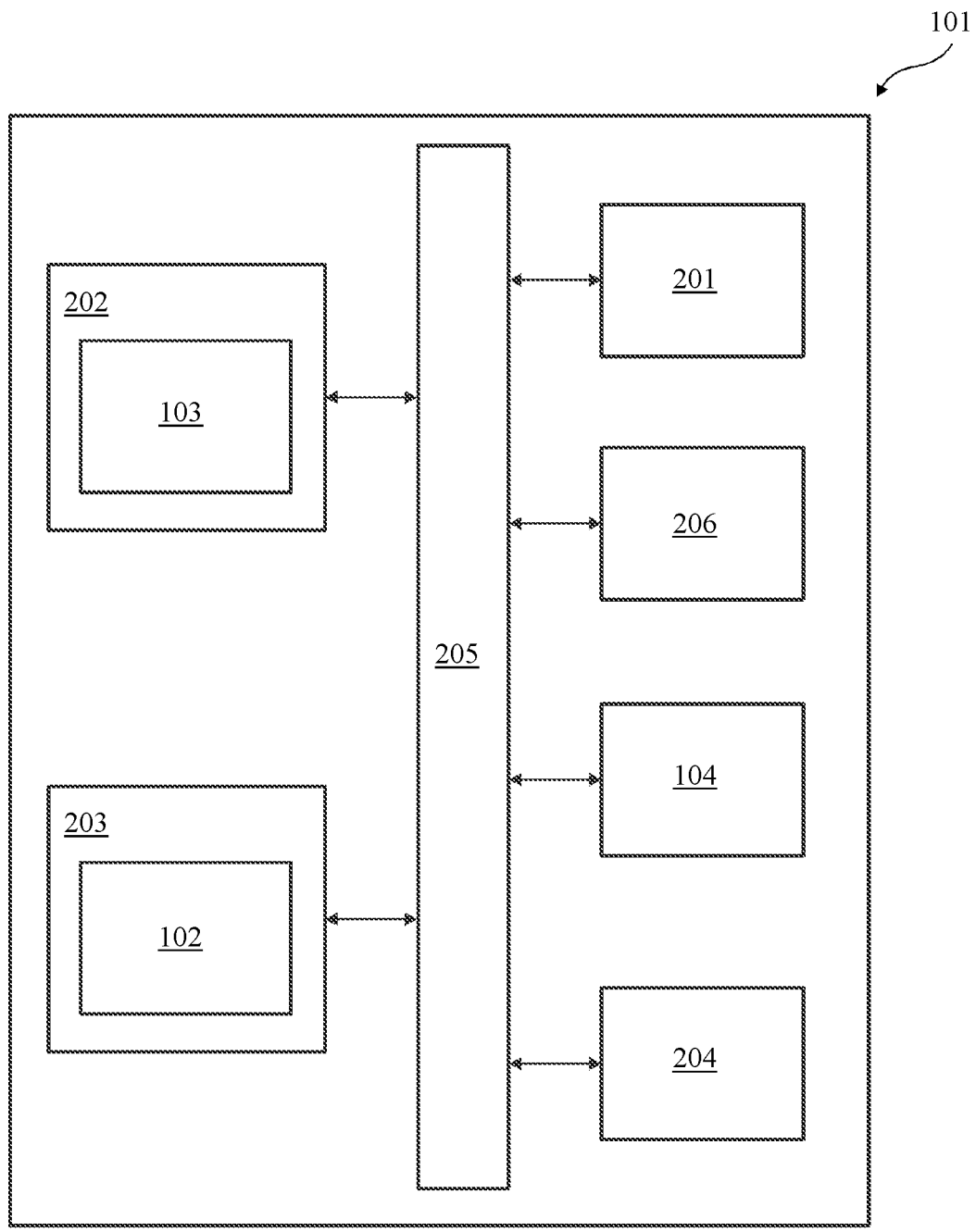
FIG. 2 illustrates a block diagram of a data processing system embodying a computer-implemented device for automatic prediction of a geographic atrophy from optical coherence tomography data of a retina of a patient.

FIG. 2 is a block diagram of a data processing system 101 in which an embodiment can be implemented, for example, as a system 101 for automated processing of medical images to output alerts A for detected dissimilarities in the medical images, configured to perform the processes as described therein. It is appreciated that the server 101 is an exemplary implementation of the system in FIG. 2. In FIG. 2, said data processing system 101 comprises a processing unit 201, a memory 202, a storage unit 203, an input unit 204, an output unit 206, a bus 205, and a network interface 104.

The processing unit 201, as used herein, means any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 101 may also include embedded controllers, such as generic or programmable logic devices or arrays, application specific integrated circuits, single-chip computers, and the like.

The memory 202 may be volatile memory and non-volatile memory. The memory 202 may be coupled for communication with said processing unit 201. The processing unit 201 may execute instructions and/or code stored in the memory 202. A variety of computer-readable storage media may be stored in and accessed from said memory 202. The memory 202 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 201 comprises a module 103 stored in the form of machine-readable instructions on any of said above-mentioned storage media and may be in communication to and executed by processing unit 201. When executed by the processing unit 201, the module 103 causes the processing unit 201 to automatically predict geographic atrophy (GA) from optical coherence tomography (OCT) data of a retina of a patient. Method steps particularly executed by the processing unit 201 to achieve the abovementioned functionality are elaborated upon in detail in FIGS. 3-5.

The storage unit 203 may be a non-transitory storage medium which stores a medical database 102. The medical database 102 is a repository of medical images and associated medical data sets related to one or more patients that is maintained by a healthcare service provider. The input unit 204 may include input means such as keypad, touch-sensitive display, camera (such as a camera receiving gesture-based inputs), etc. capable of receiving input signal such as a medical image. The bus 205 acts as interconnect between the processor 201, the memory 202, the storage unit 203, the input unit 204, the output unit 206 and the network interface 104.

Those of ordinary skill in the art will appreciate that said hardware depicted in FIG. 1 may vary for particular implementations. For example, other peripheral devices such as an optical disk drive and the like, Local Area Network (LAN)/Wide Area Network (WAN)/Wireless adapter, graphics adapter, disk controller, input/output (I/O) adapter also may be used in addition or in place of the hardware depicted. Said depicted example is provided for the purpose of explanation only and is not meant to imply architectural limitations with respect to the present disclosure.

A data processing system 101 in accordance with an embodiment of the present disclosure may comprise an operating system employing a graphical user interface. Said operating system permits multiple display windows to be presented in the graphical user interface simultaneously with each display window providing an interface to a different application or to a different instance of the same application. A cursor in said graphical user interface may be manipulated by a user through a pointing device. The position of the cursor may be changed and/or an event such as clicking a mouse button, generated to actuate a desired response.

One of various commercial operating systems, such as a version of Microsoft Windows™, a product of Microsoft Corporation located in Redmond, Washington, may be employed if suitably modified. Said operating system is modified or created in accordance with the present disclosure as described. Disclosed embodiments provide systems and methods for processing medical images.

Figure 3:
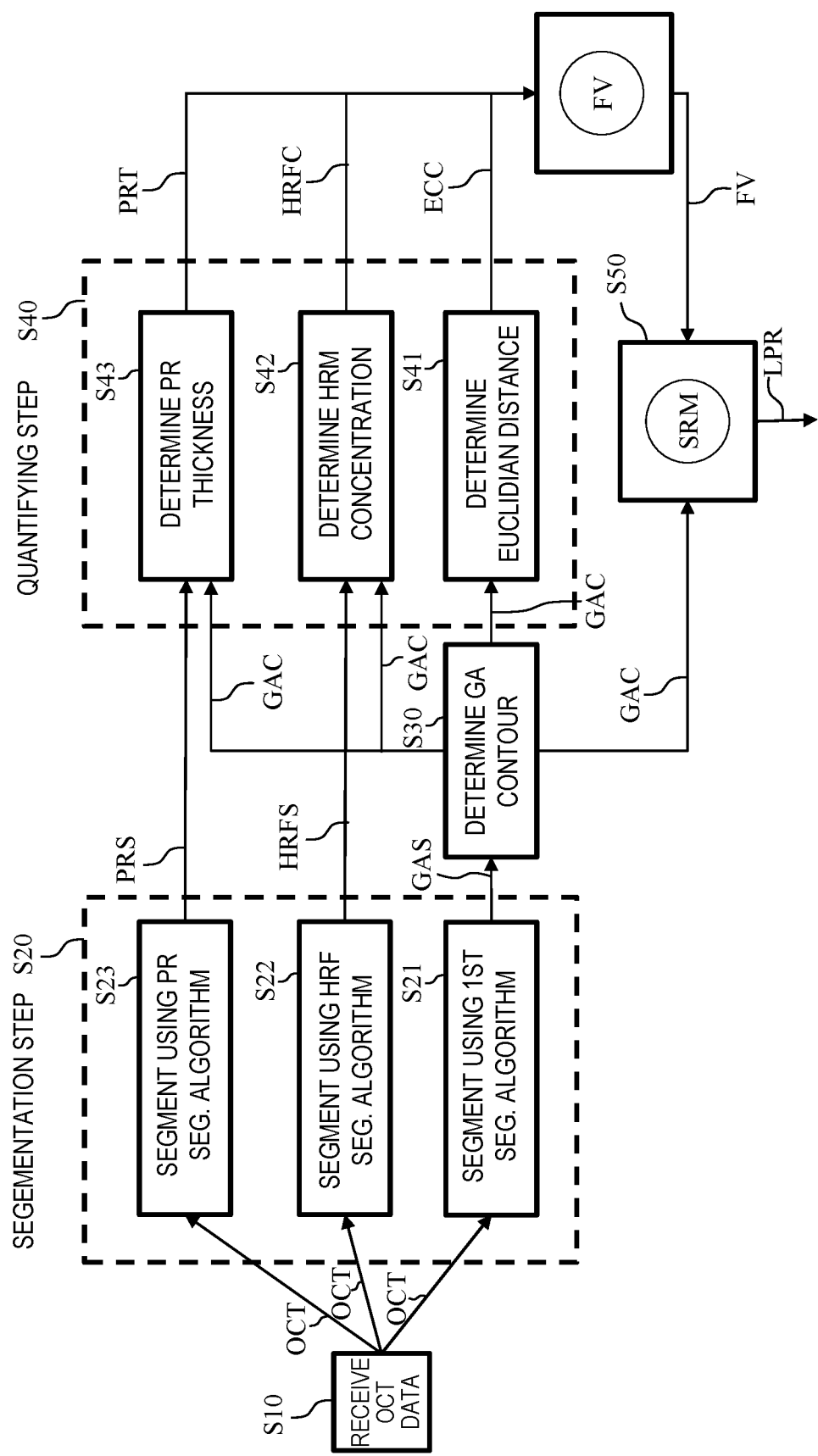
FIG. 3 shows a first embodiment of a sequence of method steps for automatic prediction of a geographic atrophy from optical coherence tomography data of a retina of a patient.

FIG. 3 illustrates a flowchart of a first embodiment of a method for automatic prediction of a geographic atrophy GA from optical coherence tomography data OCT of a retina of a patient.

The first embodiment of the method of FIG. 3 includes method steps S10-S50:

In step S10, OCT data (having the reference sign OCT) of the retina of the patient are received. For example, the OCT data are embodied as one single OCT image of the retina of the patient. In embodiments, the OCT data may include a three-dimensional retinal optical coherence tomography image.

Method step S20 is a segmentation step in which the received OCT data are segmented. In the example of FIG. 3, the segmentation step S20 includes method steps S21, S22, and S23.

In step S21, the received OCT data are segmented using a first segmentation algorithm for providing a GA segmentation GAS of the geographic atrophy in the retina.

Further, steps S22 and S23 of FIG. 3 are examples of method steps for segmenting the received OCT data using a number N1, in the example of FIG. 3 N1=2, of second segmentation algorithms for providing a number N1 (N1=2 in FIG. 3) of structure-specific segmentations HRFS, PRS of certain structures in the retina. In the example of FIG. 3, the certain structures include hyperreflective foci in the retina and photoreceptors in the retina. In this regard, the method steps S22 and S23 in FIG. 3 are embodied as follows:

In step S22, the received OCT data are segmented using a HRF segmentation algorithm for providing an HRF segmentation HRFS of the hyperreflective foci in the retina. Further, in step S23, the received OCT data are segmented using a PR segmentation algorithm for providing a PR segmentation PRS of the photoreceptors in the retina.

As one can see from FIG. 3, the segmentation step S20 has as outputs: the GA segmentation GAS of the GA in the retina, the HRF segmentation HRFS of the hyperreflective foci in the retina, and the PR segmentation PRS of the photoreceptors in the retina.

In step S30, a GA contour GAC of the geographic atrophy in the retina is determined using the provided GA segmentation GAS.

In step S40, for each margin point of N2 margin points of the GA contour GAC, a number N3 of quantifiable features are provided using the provided GA contour GAC and using the provided N1 structure-specific segmentations HRFS, PRS such that a feature vector FV including the N3 quantifiable features is provided for each margin point of the GA contour GAC. As mentioned above, N1=2 in the example of FIG. 3, and N3=3 in FIG. 3. For instance, N2 is in the range of 100.

In this regard, step S40 may be also referenced as quantifying step. In the example of FIG. 3, the quantifying step S40 includes steps S41, S42 and S43 for providing the respective feature vector FV for the respective margin point of the N2 margin points of the GA contour GAC.

In step S41, a Euclidian distance ECC of the margin point to the fovea is determined.

In step S42, a HRF concentration HRFC using the provided GA contour GAC and the provided HRF segmentation HRFS is output. For example, said step S42 is embodied by determining a mean HRF concentration HRFC for the feature vector FV of the respective margin point by adding the volumes of the HRF in a certain junctional zone around the respective margin point and dividing the added volumes by the area of the junctional zone.

In step S43, a PR thickness PRT is provided using the provided GA contour GAC and the provided PR segmentation PRS.

In the example of FIG. 3, the quantifying step S40 outputs a feature vector FV, said feature vector FV including the Euclidian distance ECC, the HF concentration HRFC, and the PR thickness PRT for each margin point of the N2 margin points.

In step S50, a respective local progression rate LPR is provided for each of the N2 margin points of the GA contour GAC by applying a spatial regression model SRM having as inputs the GA contour GAC and the N2 feature vectors FV for the N2 margin points of the GA contour GAC. For example, the spatial regression model SRM is a non-linear spatial regression model. In embodiments, the spatial regression model SRM is a generative additive mixed effects model (GAMM).

Figure 4:
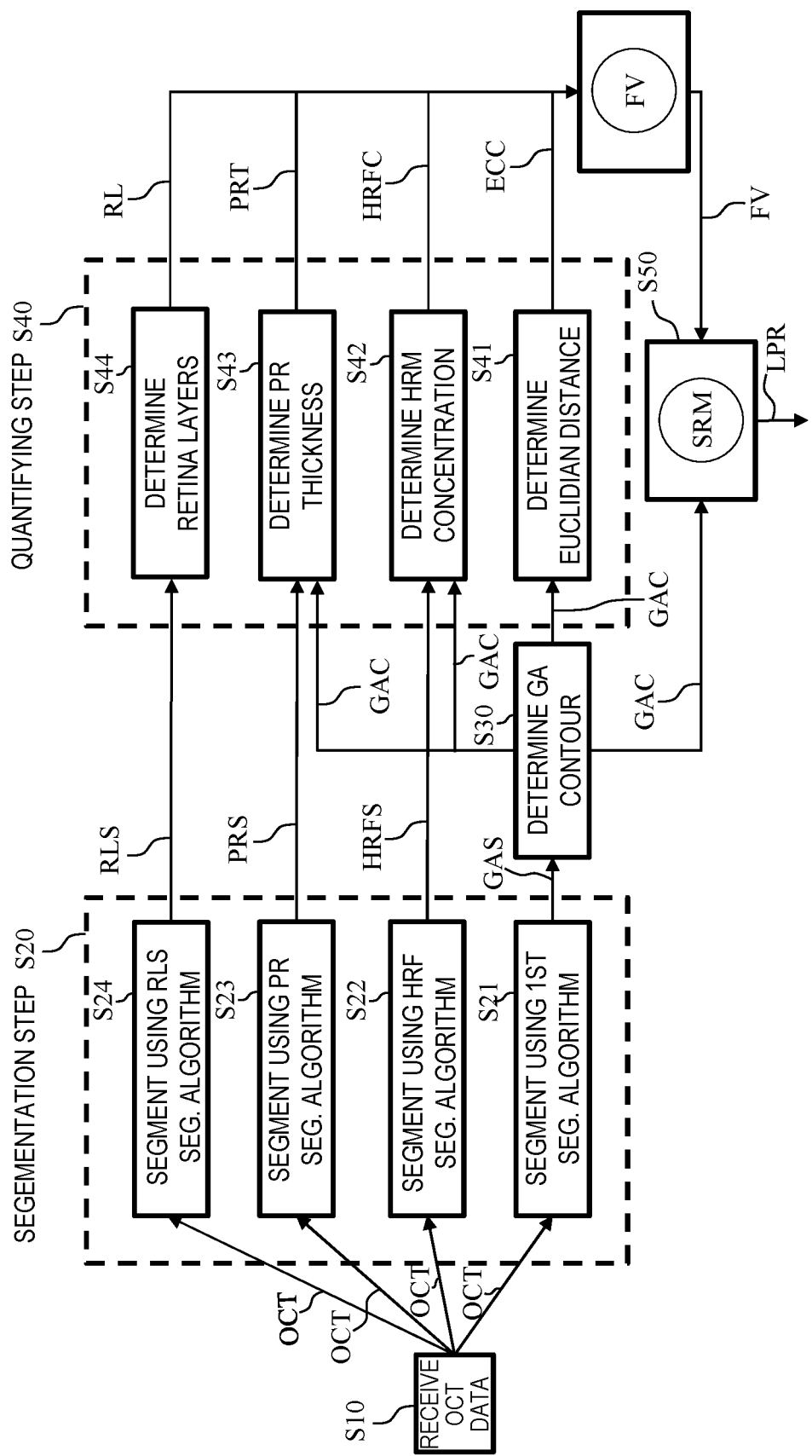
FIG. 4 shows a second embodiment of a sequence of method steps for automatic prediction of a geographic atrophy from optical coherence tomography data of a retina of a patient.

Further, FIG. 4 shows a flowchart of a second embodiment of a method for automatic prediction of a geographic atrophy GA from OCT data OCT of a retina of a patient. The second embodiment of FIG. 3 includes all features of the first embodiment of FIG. 3. In detail:

In step S10, OCT data of the retina of the patient are received. The OCT data may be embodied as one single OCT image of the retina of the patient. In embodiments, the OCT data may include a three-dimensional retinal optical coherence tomography image.

In the example of FIG. 4, the segmentation step S20 includes method steps S21, S22, S23 and S24:

In step S21, the received OCT data are segmented using a first segmentation algorithm for providing a GA segmentation GAS of the geographic atrophy in the retina.

Further, steps S22, S23 and S24 of FIG. 4 are examples of method steps for segmenting the received OCT data using a number N1, in the example of FIG. 4 N1=3, of second segmentation algorithms for providing a number N1 (N1=3 in FIG. 4) of structure-specific segmentations HRFS, PRS, RLS of certain structures in the retina. In the example of FIG. 4, the certain structures include hyperreflective foci in the retina, photoreceptors in the retina and the retina layers of the retina. In this regard, the method steps S22, S23, and S24 in FIG. 4 are embodied as follows:

In step S22, the received OCT data are segmented using a HRF segmentation algorithm for providing an HRF segmentation HRFS of the hyperreflective foci in the retina. Further, in step S23, the received OCT data are segmented using a PR segmentation algorithm for providing a PR segmentation PRS of the photoreceptors in the retina. In step S24, the received OCT data OCT are segmented using a retina layer segmentation algorithm for providing a retina layer segmentation RLS of the retina layers RL of the retina.

As one can see from FIG. 4, the segmentation step S20 has as outputs: the GA segmentation GAS of the GA in the retina, the HRF segmentation HRFS of the hyperreflective foci in the retina, the PR segmentation PRS of the photoreceptors in the retina, and the retina layer segmentation RLS of the retina.

In step S30, a GA contour GAC of the geographic atrophy in the retina is determined using the provided GA segmentation GAS.

In step S40, for each margin point of N2 margin points of the GA contour GAC, a number N3 of quantifiable features are provided using the provided GA contour GAC and using the provided N1 structure-specific segmentations HRFS, PRS, RLS such that a feature vector FV including the N3 quantifiable features is provided for each margin point of the GA contour GAC. As mentioned above, N1=3 in the example of FIG. 4, and N3=4 in FIG. 4.

Thus, in the example of FIG. 4, the quantifying step S40 includes the four steps S41, S42, S43 and S44 for providing the respective feature vector FV for the respective margin point of the N2 margin points of the GA contour GAC.

In step S41, a Euclidian distance ECC of the margin point to the fovea is determined.

In step S42, a HRF concentration HRFC using the provided GA contour GAC and the provided HRF segmentation HRFS is determined. For example, said step S42 is embodied by determining a mean HRF concentration HRFC for the feature vector FV of the respective margin points by adding the volumes of the HRF in a certain junctional zone around the respective margin point and dividing the added volumes by the area of the junctional zone.

In step S43, a PR thickness PRT is provided using the provided GA contour GAC and the provided PR segmentation PRS.

In step S44, the retina layers RL are provided using the provided GA contour GAC and the provided retina layer segmentation RLS. Thus, the quantifying step S40 of FIG. 4 outputs a respective feature vector FV for the respective margin point of the N2 margin points of the GA contour GAC, said respective feature vector FV including the Euclidian distance ECC, the HRF concentration HRFC, the PR thickness PRT and the retina layers RL of the retina.

Figure 5:
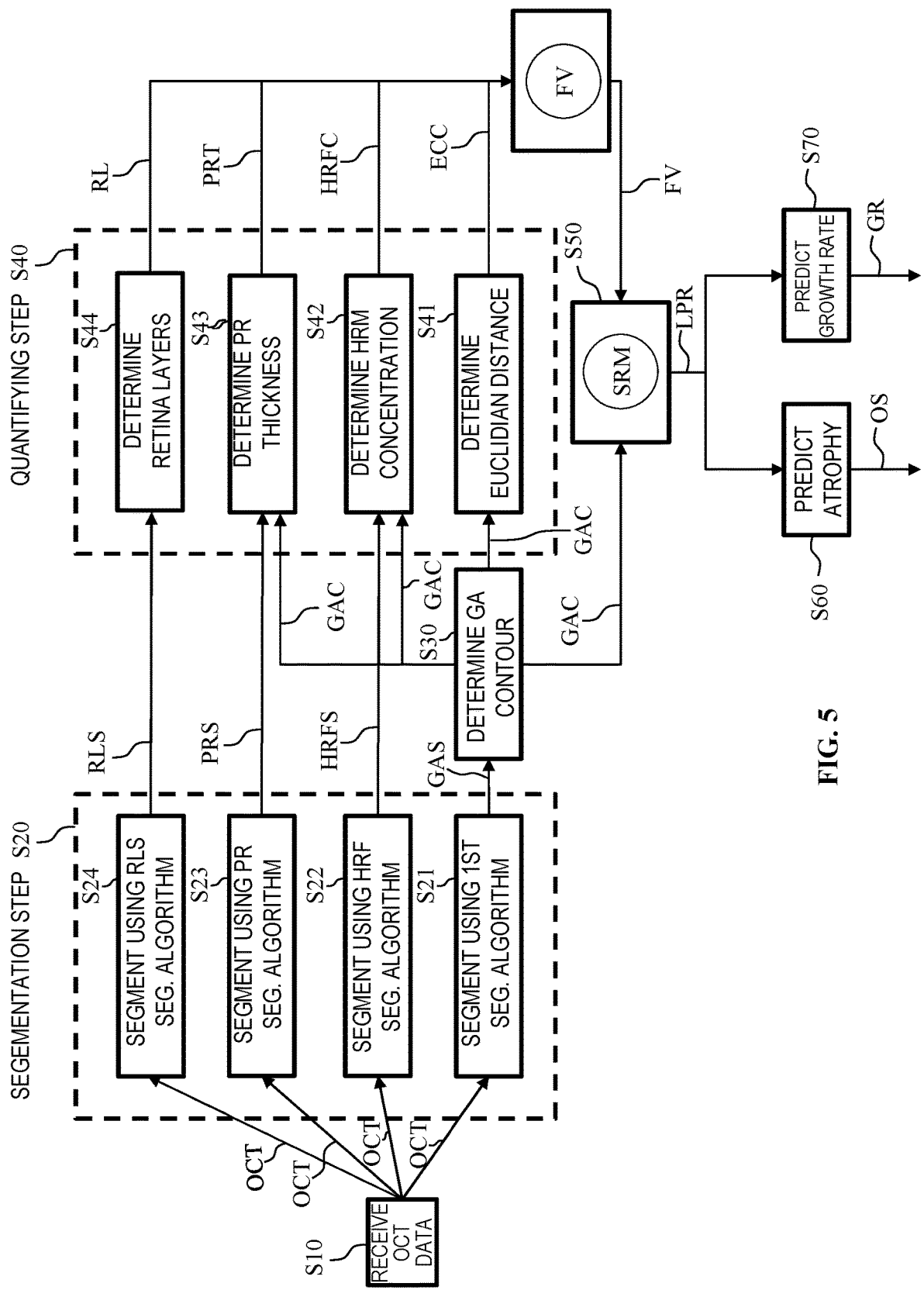
FIG. 5 shows a third embodiment of a sequence of method steps for automatic prediction of a geographic atrophy from optical coherence tomography data of a retina of a patient.

Moreover, FIG. 5 shows a flowchart of a third embodiment of a method for automatic prediction of a geographic atrophy GA from OCT data of a retina of a patient. The third embodiment of FIG. 5 is based on the second embodiment of FIG. 4 and includes all features of the second embodiment. Furthermore, the third embodiment of FIG. 5 additionally includes method steps S60 and S70, both using the local progression rates LPR of the N2 margin points as provided by step S50.

In step S60, an onset OS of an atrophy is predicted using the provided local progression rates LPR of the N2 margin points. Further, in step S70, a growth rate GR of the atrophy is predicted using the provided local progression rates LPR of the N2 margin points.

Figure 6:
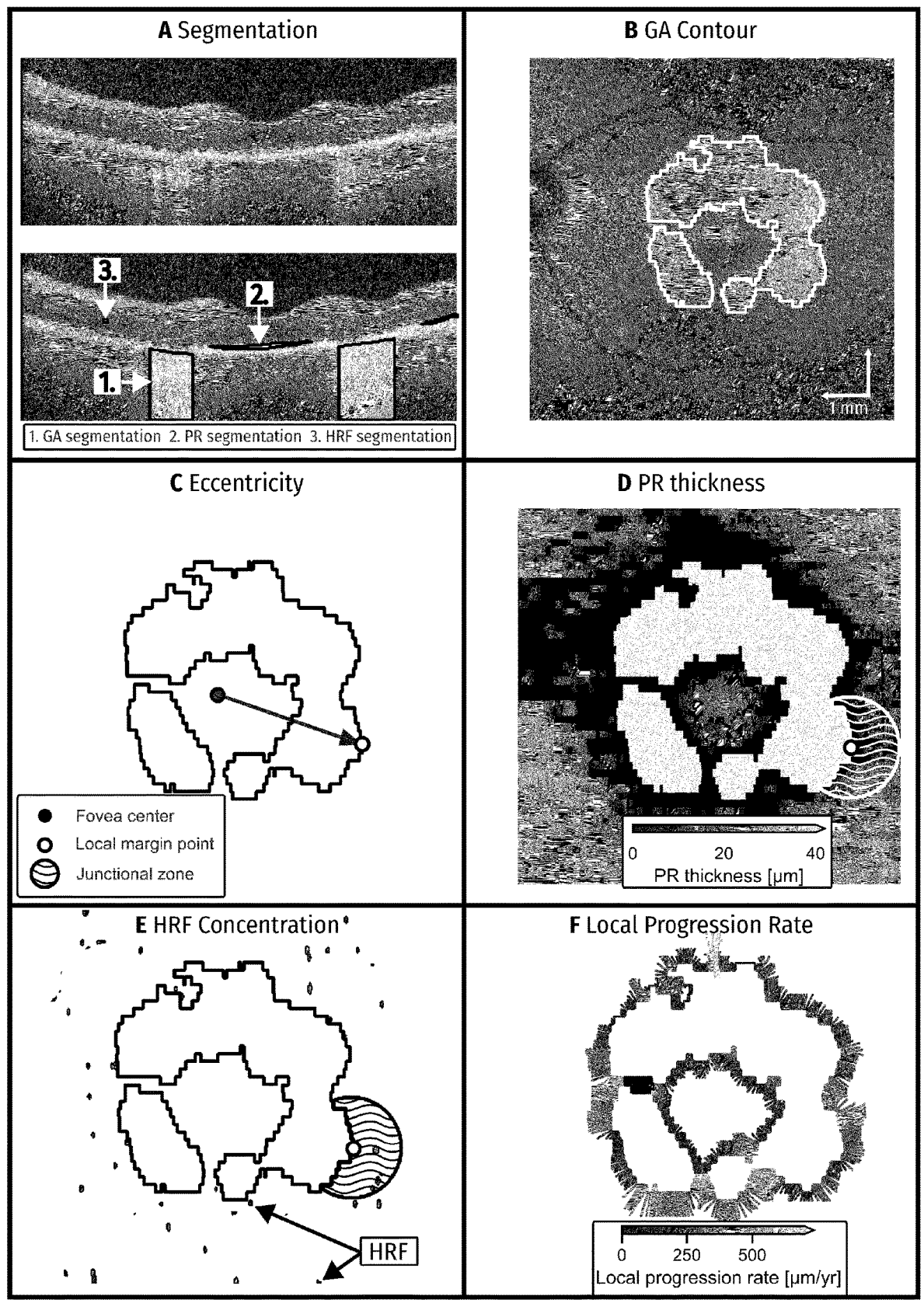
FIG. 6 shows an illustration of an example of a processing pipeline for automatic prediction of a geographic atrophy from optical coherence tomography data of a retina of a patient.

FIG. 6 shows an illustration of an example of the processing pipeline for automatic prediction of geographic atrophy from optical coherence tomography OCT data of a retina of a patient. The processing pipeline of FIG. 6 may be provided by executing one of the methods of FIGS. 3 to 5 for automatic prediction of a geographic atrophy GA from OCT data of a retina of a patient. Said FIG. 6 includes parts (A)-(F) illustrating:

(A) Automatic segmentation of geographic atrophy (GA) (1), photoreceptor (PR) layers (2) and hyperreflective foci (HRF) (3) in optical coherence tomography (OCT) images of the retina. (B) Contour of a GA (white) overlaid over a fundus image. Features and Local Progression Rate (LPR) are computed for each margin point of the GA contour. Features are distance to the fovea (C), mean photoreceptor thickness in a circular junctional zone around each GA margin point (D), exemplarily demonstrated as the partial circle with 800 mm radius. HRF concentration (E) is the volume of HRF in the circular junctional zone divided by junctional zone area. (F) The local progression rate (LPR) at each GA margin point is regressed from the local features, and describes the local growth of GA margin in µm/yr unit. In this example, the GA LPR within 1 year is illustrated.

Computerized devices may be suitably designed for implementing embodiments of the present invention as described herein. Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages.

In particular, each block of the block diagrams may be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCE CHARACTER LIST 100 system
101 computer-implemented device
102 medical database
103 module
104 network interface
105 network
107 client device
108 medical imaging unit
201 processing unit
202 memory
203 storage unit
204 input unit
DPM disease progression method
ECC eccentricity
FV feature vector
GA geographic atrophy
GAC GA contour
GAMM generative additive mixed effects model
GAS geographic atrophy segmentation
GR growth rate
HRF hyperreflective foci
HRFC HRF concentration
HRFS HRF segmentation
LPR local progression rate
OCT optical coherence tomography data
ODE ordinary differential equation
OS onset
PDE partial differential equation
PR photoreceptor
PRS PR segmentation
PRT PR thickness
RL retina layer
RLS retina layer segmentation
SRM spatial regression model
S10 method step
S20 method step
S21 method step
S22 method step
S23 method step
S24 method step
S30 method step
S40 method step
S41 method step
S42 method step
S43 method step
S44 method step
S50 method step
S60 method step
S70 method step

The invention claimed is:

1. A computer-implemented method for automatic prediction of a geographic atrophy (GA) from optical coherence tomography (OCT) data of a retina of a patient, the method comprising the following steps:
   a) receiving OCT data of the retina of the patient,
   b) segmenting the received OCT data using a first segmentation algorithm for providing a GA segmentation of the geographic atrophy in the retina,
   c) segmenting the received OCT data using a number N1, wherein N1 indicates a number of second segmentation algorithms and a same number of structure-specific segmentations of certain structures in the retina provided by the number of second segmentation algorithms, with $N1 \geq 1$,
   wherein the step c) includes:
   c1) segmenting the received OCT data using a hyperreflective foci (HRF) segmentation algorithm for providing a HRF segmentation of the hyperreflective foci in the retina, c2) segmenting the received OCT data using a photoreceptor (PR) segmentation algorithm for providing a PR segmentation of the photoreceptors in the retina, and/or c3) segmenting the received OCT data using a retina layer segmentation algorithm for providing a retina layer segmentation of the retina layers of the retina, d) determining a GA contour of the geographic atrophy in the retina using the provided GA segmentation, e) for each margin point of N2 margin points of the GA contour, providing a number N3 of quantifiable features using the provided GA contour and using the provided N1 structure-specific segmentations such that a feature vector including the N3 quantifiable features is provided for each margin point of the GA contour, and f) providing a respective local progression rate for each of the N2 margin points by applying a spatial regression model having as inputs the GA contour and the N2 feature vectors for the N2 margin points of the GA contour.

2. The method of claim 1, wherein the spatial regression model is a non-linear spatial regression model, in particular a generative additive mixed effects model.

3. The method of claim 1, wherein the step e) includes, for providing the respective feature vector for the respective margin point of the N2 margin points of the GA contour:

e1) determining a Euclidian distance of the margin point to the fovea, e2) providing a HRF concentration using the provided GA contour and the provided HRF segmentation, e3) providing a PR thickness using the provided GA contour and the provided PR segmentation, e4) providing the retina layers using the provided GA contour and the provided retina layer segmentation, and/or e5) determining a progression direction of the geographic atrophy in the retina.

4. The method of claim 3, wherein the step e2) is embodied by:

determining a mean HRF concentration for the feature vector of the respective margin point by adding the volumes of the HRF in a certain junctional zone around the respective margin point and dividing the added volumes by the area of the junctional zone.

5. The method of claim 3, wherein the step e3) is embodied by:

determining a mean PR thickness for the feature vector of the respective margin point by adding the values of the PR thicknesses in a certain junctional zone around the respective margin point and dividing the added values by the area of the junctional zone.

6. The method of claim 1, further comprising step g):
predicting an onset of an atrophy using the provided local progression rates of the N2 margin points.

7. The method of claim 1, further comprising step h):
predicting a growth rate of the atrophy using the provided local progression rates of the N2 margin points.

8. The method of claim 1, wherein the OCT data is embodied as one single OCT image of the retina of the patient, and steps a) through f) are executed based on said single OCT image.

9. The device of claim 1, wherein the OCT data includes a three-dimensional retinal OCT image.

10. A computer-implemented device for an automatic prediction of a geographic atrophy (GA) from optical coherence tomography (OCT) data of a retina of a patient, the computer-implemented device comprising:

one or more processors, a receiving unit which is configured to receive the OCT data captured by a medical imaging unit, and a memory coupled to the one or more processors, the memory comprising a module of instructions that when executed cause the one or more processors to perform the method steps as claimed in claim 1 using a trained machine learning network.

11. The device of claim 10, wherein the receiving device is embodied as an OCT device or as an intermediate imaging computer platform, for example as a picture archiving and communication system, and wherein the one or more processors are included in a cloud server.

12. The device of claim 11, wherein the cloud server includes a cloud-based artificial intelligence platform and a web-based user interface.

13. A system for an automatic prediction of a geographic atrophy (GA) from optical coherence tomography (OCT) data of a retina of a patient, the system comprising:

one or more servers, and a medical imaging unit coupled to the one or more servers, wherein the one or more servers comprise instructions, which when executed cause the one or more servers to perform the method steps as claimed in claim 1 using a trained machine learning network.

14. A non-transitory computer readable medium on which program code sections of a computer program are saved, the program code sections being loadable into and/or executable in a system to make the system execute the method steps as claimed in claim 1 when the program code sections are executed in the system.

* * * * *